United States Patent [19]

Hendriks et al.

[11] 4,370,304
[45] Jan. 25, 1983

[54] TWO-PHASE SPRAYING DEVICE AND REACTION CHAMBER FOR THE PREPARATION OF A PRODUCT CONTAINING AMMONIUM ORTHOPHOSPHATE

[75] Inventors: Petrus F. A. M. Hendriks, Geleen; Arie Jansen, Ridderkerk; Willem B. van den Berg, Prinsenbeek; Cornelis Hoek, Nieuwstadt, all of Netherlands

[73] Assignee: Unie van Kunstmestfabrieken, B.V., Utrecht, Netherlands

[21] Appl. No.: 294,929

[22] Filed: Aug. 21, 1981

Related U.S. Application Data

[62] Division of Ser. No. 43,423, May 29, 1979, Pat. No. 4,313,918.

[30] Foreign Application Priority Data

Jun. 1, 1978 [NL] Netherlands .................. 7805957

[51] Int. Cl.³ .............................................. B01F 3/04
[52] U.S. Cl. ............................... 422/224; 239/472; 239/501; 261/76; 261/79 A; 261/DIG. 75; 366/338; 423/310
[58] Field of Search .............. 261/76, 79 A, DIG. 26, 261/DIG. 75; 422/224, 228, 229; 252/359 R; 366/338; 159/4 R, 4 B; 239/472, 501; 423/310, 312, 313

[56] References Cited

U.S. PATENT DOCUMENTS

| | | | |
|---|---|---|---|
| 1,183,098 | 5/1916 | Merrell et al. | 159/4 B |
| 2,183,561 | 12/1939 | Hamblin | 261/DIG. 26 |
| 2,411,186 | 11/1946 | Boeckeler | 159/4 B |
| 2,990,165 | 6/1961 | Joseph | 261/DIG. 26 |
| 3,050,374 | 8/1962 | Burt et al. | 159/4 B |
| 3,833,719 | 9/1974 | Kuerten et al. | 261/DIG. 75 |
| 3,984,323 | 10/1976 | Evens | 261/DIG. 75 |
| 4,179,222 | 12/1979 | Strom et al. | 422/224 X |

FOREIGN PATENT DOCUMENTS 1252651 11/1971 United Kingdom .

Primary Examiner—Richard L. Chiesa

[57] ABSTRACT

Ammonium orthophosphate products are prepared by reacting ammonia and phosphoric acid together at high speed under vigorous mixing conditions by spraying the reactants through a two-phase, dual coaxial mixer/sprayer and separately controlling the supply and axial outflow rate of the phosphoric acid at 1 to 10 m/sec. and the outflow rate of ammonia at 200 to 1000 m/sec. (N.T.P.). Thorough mixing and a homogeneous product is obtained by directing the outflow spray into a coaxial cylindrical reaction chamber of a specified size with respect to the diameter of the outermost duct of the sprayer/mixer. The product may be granulated on a moving bed of granules and adjusted in respect of the $NH_3$ to $H_3PO_4$ content by changing the concentration of the phosphoric acid and/or supplying additional ammonia to the granulation bed.

2 Claims, 3 Drawing Figures

TWO-PHASE SPRAYING DEVICE AND REACTION CHAMBER FOR THE PREPARATION OF A PRODUCT CONTAINING AMMONIUM ORTHOPHOSPHATE

This is a division of application Ser. No. 43,423, filed May 29, 1979, now U.S. Pat. No. 4,313,918.

BACKGROUND OF THE INVENTION

This invention relates to a process for preparing a product containing ammonium orthophosphate and that is substantially free of ammonium polyphosphate. The product is prepared from ammonia and phosphoric acid, in which phosphoric acid and gaseous ammonia are contacted together by means of a two-phase spraying device provided with two coaxial ducts. The ammonia flows through the outer duct and phosphoric acid through the inner one.

A process of this type is known from British Pat. No. 1,252,651. In the process described in the British patent the ammonia and the phosphoric acid are passed through a joint discharge nozzle of a spraying device and sprayed onto a bed of ammonium salt granules that are kept moving in a rotating drum. Inside the spraying device, the reactants come into only very imperfect contact with each other only while they flow through the nozzle. Consequently, the mixing is very incomplete and, as a result, the reaction is effected substantially in the bed of the solid particles in the drum. Using this process a homogeneous product is not obtained within the spraying device. To obtain a homogeneous product, spraying onto the moving bed of granules is necessary, so that homogenization can be effected in this bed. Another drawback of this known process is that part of the ammonia leaving the spraying mechanism as a gas does not reach the bed of solid particles and is retained in the air over the bed in the drum. This ammonia is withdrawn from the drum, together with air that is also present and is recovered in a washing device by washing with an acid. It is clear that the required capacity of the washing device must be substantial as the amount of ammonia that does not react with the phosphoric acid in the drum is also substantial. In addition, when the amount of ammonia to be washed increases, there is a greater chance of reaching an $NH_3/H_3PO_4$ ratio in the washing acid at which monoammonium dihydrogen phosphate crystallizes and undesirable deposits are formed.

DETAILED DESCRIPTION OF THE INVENTION

The present invention provides a process in which the above-mentioned drawbacks of the known process do not occur or if they occur only to a considerably lesser extent. According to the present invention, this improvement is achieved by supplying both the ammonia and phosphoric acid under carefully controlled rates. More specifically, the axial outflow rate of the phosphoric acid from the two-phase spraying device is from 1 to 10 m/sec in combination with the axial outflow rate of the ammonia of from 200 to 1000 m/sec (N.T.P.). The two flows are contacted with each other and are thoroughly mixed together in a cylindrical reaction zone forming the extension of the two-phase spraying device and having a diameter D of 2-4 times the outer diameter of the ammonia flow leaving the two-phase spraying device and a length of 10-25 times said diameter D.

The unit m/sec (N.T.P.) used for the outflow rate of the ammonia indicates that the actual rate has been recalculated to the rate the ammonia would have at normal temperature and pressure.

The use of high rates within the limits specified above for the two reactants and in a confined reaction zone in which lateral spreading of the flows from the two-phase spraying device is restricted, causes the reactants to be mixed thoroughly so that a high degree of conversion is reached and a virtually homogeneous product substantially consisting of ammonium orthophosphates is obtained without the necessity of further homogenization, e.g., in a moving bed of granules that have already been formed. Owing to the high rates and the consequent very short residence time in the reaction zone, hardly any or no ammonium polyphosphates are formed, even at higher temperatures. If the starting material is phosphoric acid prepared by the so-called wet process, iron and aluminum phosphates that are unavoidable in this type of product will be present, i.e., in addition to the ammonium orthophosphates.

Use is preferably made of a two-phase spraying device in which the average diameter and, if so desired, the cross-sectional area of the annular ammonia duct, gradually decreases towards the end, as viewed in the direction of flow, so that the outgoing ammonia flow hits the central phosphoric-acid flow on all sides and at high speed. Further improvement of the contact between the two reactants can be achieved according to the present invention in that the mixture flowing through the reaction zone is passed to the outflow opening by way of at least two oppositely twisted baffle plates arranged one after the other as viewed in the direction of flow and having a dimension normal to the direction of flow that is equal to the diameter of the reaction zone. In this arrangement, the length of the reaction zone is taken to be the distance between the outflow openings of the two-phase spraying device and the first baffle plate.

The use of such baffle plates is particularly important if products with a molar $NH_3/H_3PO_4$ ratio of over 1.2:1 are to be prepared, but it is also favorable, of course, in the preparation of products in which this ratio is lower. The molar $NH_3/H_3PO_4$ ratio here denotes the ratio between the number of moles of $NH_3$ bound to water-soluble $H_3PO_4$ and the number of moles of this water-soluble $H_3PO_4$.

In preparing products with a molar $NH_3/H_3PO_4$ ratio of up to 1.5:1, the process according to the present invention permits one to reach an $NH_3$ efficiency of over 90%, which means that less than 10% of the ammonia supplied to the reaction zone leaves the reaction zone as ammonia. When this ammonia is recovered by washing with phosphoric acid, this results in a molar $NH_3/H_3PO_4$ ratio of at most 0.15:1, which is not objectionable.

We have found that as the $P_2O_5$ content of the phosphoric acid used is lower, a higher molar $NH_3/H_3PO_4$ ratio and a higher $NH_3$ efficiency are obtained. In this case, the moisture content of the product naturally increases as well. In the process according to the present invention, the amount of ammonia that will not react with the phosphoric acid can be determined beforehand accurately by control of the concentration of the phosphoric acid and selection of the molar $NH_3/H_3PO_4$ ratio.

Proper selection of the P$_2$O$_5$ content of the phosphoric acid in the range below 45% permits reaching almost complete conversion of the ammonia supplied to the reaction, while a product is formed that contains up to 50 mole % of diammonium monohydrogen phosphate and the desired amount of water in addition to monoammonium dihydrogen phosphate.

This is particularly suitable if the product is to be granulated, which can, for instance, be effected by distributing it in a known way onto or in a moving bed of granules that have already formed, such as a bed of granules formed in a granulating drum, as only a smaller amount of water need be evaporated. Depending upon the recycling ratio, that is the ratio of the amount of product recycled to the amount of product to be granulated, the moisture content of the product supplied from the reaction zone to the granular bed can be selected such that after-drying of the granulated product is not required. If production is followed immediately by granulation, use will generally be made of phosphoric acid with a P$_2$O$_5$ content of over 40%, as, at lower concentrations, comparatively high recycling ratios are required to avoid over-granulation that accompanies the high moisture content.

The product formed in the reaction zone can be processed as such without altering the composition.

The process according to the present invention makes it possible to prepare directly a product that consists substantially of monoammonium dihydrogen phosphate and has a molar NH$_3$/H$_3$PO$_4$ ratio of, for example, about 1.1:1. Mixtures of monoammonium dihydrogen phosphate and diammonium monohydrogen phosphate with a molar NH$_3$/H$_3$PO$_4$ ratio of up to about 1.5:1 can also be prepared in one step.

Using the process according to the present invention, it is possible to prepare products with a high content of diammonium monohydrogen phosphate, such as products with a molar NH$_3$/H$_3$PO$_4$ ratio of 1.6–1.8. In order to accomplish this, a product with a molar NH$_3$/H$_3$PO$_4$ ratio of 1.25–1.40 may be prepared in the reaction zone, and then granulated in a moving bed of granules that have already been formed, as described above, while ammonia is separately supplied to the granular bed to further convert the phosphoric acid. The first part of the ammonia-treatment of the phosphoric acid then proceeds with a high NH$_3$ efficiency which approaches 100%. Furthermore, when using phosphoric acid with a P$_2$O$_5$ content of 45–46%, the resulting product in the reaction zone has a moisture content such that a low recycling ratio is sufficient. This recycle ratio may vary between 1.5:1 and 6:1. When the product to be recycled is cooled and, hence part of the reaction heat is thus removed, a lower recycling ratio may, of course, be used. In that case, a separate drying treatment may be unnecessary. If still other solid substances, e.g., potassium salts, are fed to the bed, the recycle ratio also depends on the amount of such additions.

The invention in its apparatus aspect relates to an apparatus for conducting the above-described process. This novel apparatus includes a two-phase spraying device comprising two coaxial ducts that are narrower at the outflow ends and discharge into a common space and is characterized in that the two-phase spraying device is arranged to discharge into one end of a coaxial cylindrical reaction space or zone that is provided with at least one discharge opening at the other end. The cylindrical reaction space has a diameter of D of about 2 to 4 times the outer diameter of the annular outflow opening of the outer spray duct, and has a length of 10–25 times the diameter D.

In a particular embodiment of this apparatus, which is suitable for the preparation of products that contain considerable amounts of diammonium monohydrogen orthophosphate in addition to monoammonium dihydrogen orthophosphate, the cylindrical space accommodates at least two oppositely twisted baffle plates arranged one after the other and having a dimension normal to the central axis of the cylindrical space that is equal to the diameter of this space.

BRIEF DESCRIPTION OF THE DRAWINGS

The present invention is further described with reference to the drawings in which:

FIG. 3 is a section through the device of FIG. 2 along line A—A.

DETAILED DESCRIPTION OF THE DRAWINGS

Figure 1:
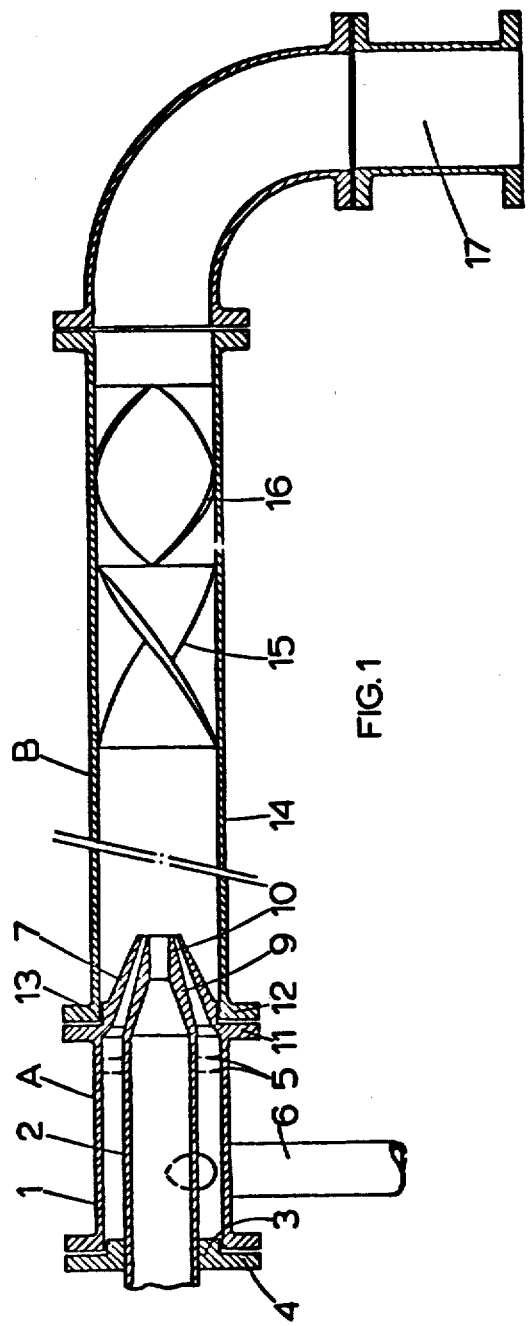
FIG. 1 is a longitudinal cross-section of an apparatus that can be used to conduct the process according to the present invention.

In FIG. 1, the two-phase spraying device is generally denoted by A and the reaction zone by B. The two-phase spraying device A is constructed from a cylindrical part 1 with a central tube 2 maintained in place by the centering edge 3 of flange 4 and one or more diffuser rings 5, which may be two or more annular perforated plates that are arranged so that the apertures in consecutive rings are staggered.

The cylindrical part 1 is provided with an ammonia feed tube 6 fitted tangentially and, near the outflow end, changes into a conically constricting portion 7. The outflow end of tube 2, which is contained in and coincides with the outflow end of the cylindrical part 1, changes internally into a narrower cylindrical portion 10 by way of a tapered conical portion 9. Externally, the outflow end of tube 2 is fully conical with an apex angle that is smaller than the apex angle of the conical portion 7 of cylindrical part 1. The average conical angle of the constricting part of the annular ammonia duct ranges between 30° and 35°.

The two-phase spraying device A is so fitted to the cylindrical part 14 accommodating reaction zone B by means of flanges 11 and 12 and centering edge 13 is provided such that the central lines of two-phase spraying device A and cylindrical part 14 coincide. The internal diameter of the cylindrical part 14 is between about 2 to 4, for instance, times the outer diameter of the annular outflow opening of cylindrical part 1. The length of cylindrical part 14, which is not shown in full in the drawing, is about 10 to 25, for examples, 18 times the diameter.

The cylindrical part 14 need not be straight. For instance, with a view to the arrangement of the device in or near a granulating device, it may be desirable to provide the cylindrical part with one or more bends, e.g., a 90° bend, so that the two-phase spraying device A and the reactor part B can be arranged approximately horizontally and the discharge can still be straight downwards.

The cylindrical part 14 may accommodate two or more blades 15 and 16 or twisted baffle plates having a special shape. These blades are shaped from rectangular flat plate sections with a length of at least 1.5 times the width, which corresponds to the diameter of the cylindrical part 14. The plate sections are then so twisted about their longitudinal axes that the ends are twisted about 180° with respect to each other. The twist of 5 consecutive blades is preferably alternately clock-wise and counterclock-wise.

The distance between the outflow end of the two-phase spraying device and the first blade is, for instance, 10 times the diameter of the cylindrical part 14, but at least 8 times this diameter. The end of the cylindrical part 14 is provided with a discharge opening 17. This opening has a cross-section that is equal to the cross-section of cylindrical part 14, but may be smaller, if so desired. If the reaction product to be discharged from the reaction zone is to be distributed, e.g., in or onto a granulation bed, a branched discharge part may be fitted. The total surface area of the overflow openings of the branches should then correspond to the cross-sectional area of the cylindrical part upstream of the branched part.

Figure 2:
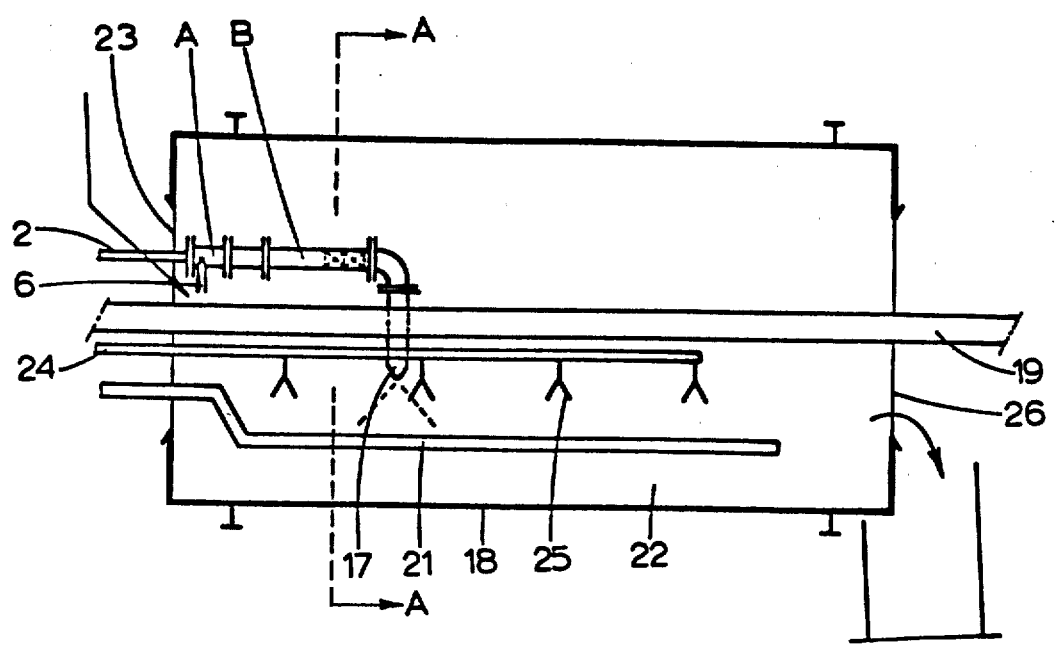
FIG. 2 is a diagrammaticle representation of an apparatus according to FIG. 1 position in a granulating drum.
Figure 2:
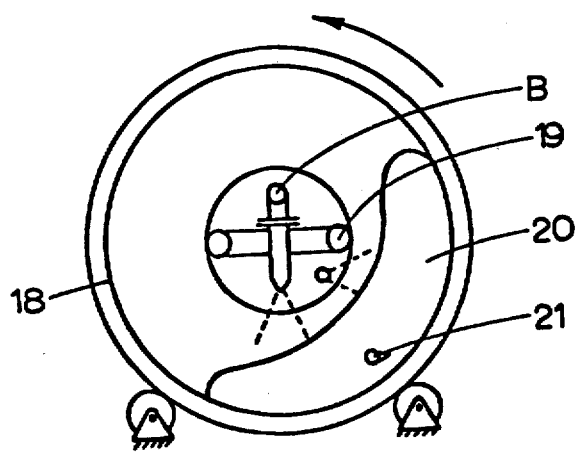

One or several of the apparatus shown in FIG. 1 may be arranged in or over a granulating device. This may be, for instance, a granulating drum, as shown in FIGS. 2 and 3. With a view to the space available and the necessary supporting means, the two-phase spraying device A with reactor part B is so arranged that its central axis is approximately parallel to the central axis of drum 18 and the discharge end of the reactor part is bent downwards through an angle of about 90°, as stated above. It discharges into the drum at a height such that during operation, the discharge openings are at an appropriate distance over the bed 20 of granules that have formed.

Drum 18 is arranged at a slight slant and, if necessary, is provided with a conduit 21 for supply of liquid ammonia to the granular bed. The higher end of the drum is provided with a central opening 23 through which the recycling product is passed into the drum as shown by the arrow adjacent lead line 23 and through which also the supporting means 19 and the ammonia conduit 21 extend into the drum. The supporting means may carry not only the two-phase spraying device with the reactor parts, but also a conduit 24 with spraying members 25 for the liquid phase. The lower end of the drum has a central opening 26 through which the granulated product is discharged as indicated by the downward arrow.

The process according to the present invention is carried out by means of the above apparatus as follows:

Gaseous ammonia is fed to the cylindrical part 1 of two-phase spraying device A through feed line 6. This conduit discharges tangentially into cylindrical part 1, although it might also be connected radially. If a radial connected is used, however, severe wear of tube 2 may occur at the place of inflow and at the place diametrically opposed thereto. A tangential feed, moreover, gives a better distribution of the ammonia over the annular cross-section of the space between cylindrical part 1 and tube 2. A uniform flow rate along the circumference of the annular outflow opening is effected, at a slight pressure drop, by the diffuser rings 5, so that the ammonia flows evenly towards the outflow opening and leaves this opening while it is accurately directed towards the center of the reaction zone. A small amount of steam of 0.5–3% by weight is added continuously to the ammonia in order to prevent formation and deposition of iron and aluminum phosphates. An amount of no more than about 1–2% by weight usually suffices. Such small amounts of steam have no influence on the composition of the product.

Phosphoric acid with a $P_2O_5$ concentration of about 30 to 54% is supplied through central tube 2. This may be fresh acid, but it may also be supplied from a device in which $NH_3$ and dust are removed by means of fresh phosphoric acid from the air discharged from a granulating device.

The dimensions of the annular outflow opening through which the ammonia flows from the cylindrical part 1 into the cylindrical part 14 of reaction zone B have been selected such that the axial velocity of the ammonia flow ranges between about 200 and about 1000 m/sec (N.T.P.), for example, 700 m/sec (N.T.P.). This velocity corresponds approximately to the velocity of sound. The outflow opening of tube 2 has a diameter such that the phosphoric acid flows into reaction zone B at an axial velocity of about 1 to about 10 m/sec, for example 7 m/sec. The total pressure difference across the two reaction zones A and B is, for instance, 200–400 kPa.

Due to the velocities employed, the ammonia and the phosphoric acid are very rapidly and thoroughly mixed so that the ammonia combines with the phosphoric acid in a very short time to form monoammonium dihydrogen phosphate and, if the ratio between the amounts of ammonia and the $P_2O_5$ fed in with the phosphoric acid is sufficient, to form diammonium monohydrogen phosphate. This amount of $P_2O_5$ naturally depends on the amount of phosphoric acid and its concentration. If the phosphoric acid has a comparatively low $P_2O_5$ concentration, for example, of below 40%, it results in products with a high molar $NH_3/H_3PO_4$ ratio while the proportion of free ammonia, that is the percentage of ammonia fed in that leaves the reaction zone as ammonia together with the product, is low, the resulting product then contains considerable moisture. In the case of granulation, this gives rise to over-granulation—too many coarse granules are formed and even lumps are formed, unless a sufficiently high recycling ratio is used and/or a sufficient amount of solid substances to be admixed, such as e.g., potassium chloride, is fed in.

At a high $P_2O_5$ content of the phosphoric acid, this risk does not exist or hardly exists, but the proportion of free ammonia is higher, and lower molar $NH_3/H_3PO_4$ ratios will have to be accepted. However, if mixing baffles 15 and 16 are present, the mixing is improved considerably because the rotation that is imparted to the reaction mixture by the tangential feed of the ammonia changes direction several times. The result is a higher molar $NH_3/H_3PO_4$ ratio of the product leaving reaction zone B. The use of blades or baffles is necessary if molar $NH_3/H_3PO_4$ ratios of over 1.2:1 are to be reached. The special shape of the blades offers the advantage that the mixing is improved considerably without large pressure losses. Two blades are usually sufficient and a greater number usually does not give more favorable results.

The high velocities used result in only a very short residence time of the reaction mixture in the reaction zone B. As a result, hardly any heat of reaction can be removed and the temperature of the reaction mixture rises to 180° to 225° C. near discharge opening 17. However, the time available is too short for the formation of an unacceptable amount of ammonium polyphosphates. The reaction product is discharged from the reaction zone through discharge opening 17 to a collecting space in which atmospheric pressure prevails. With the attendant sudden expansion, the reaction product is atomized into fine solid particles, while a considerable part of the water originally present evaporates.

If the product of fine grains thus obtained is to be granulated into coarser granules, it is spread over a bed of granules that have already formed, for example, in a granulating drum as shown in FIGS. 2 and 3. In this bed the molar $NH_3/H_3PO_4$ ratio can also be raised to, for example, 1.6 by distributing liquid ammonia in the bed through conduit 21.

The product discharged from the drum through opening 26 is classified into various sizes according to standard procedures. The product that is too coarse is crushed and recycled together with the product that is too fine in an amount that ensures that the reaction heat released in the ammonia-treatment of phosphoric acid is removed. A recycle ratio of 3 to 6 parts of recycled product to 1 part of fresh supply is generally sufficient for this purpose.

Several experiments were carried out on the basis of the process according to the present invention. The data and the results of these experiments are given in the following examples. The experiments were carried out in equipment arranged parallel to an existing production unit and connected to the accessory granulating drum, drying drum, dust-collecting system and a washing installation in which the $NH_3$ discharged together with the air from the granulating drum and, possibly, the drying drum and the dust in the air from the dust-collecting system were recovered by washing with fresh phosphoric acid. The washing acid used, which consequently contained a certain amount of $NH_3$, was used as the reactor feed.

EXAMPLE 1

Phosphoric acid with $NH_3$ was reacted in a reactor according to FIG. 1, but without baffles 15 and 16. The major dimensions of the reactor were as follows:

| | |
|---|---|
| Diameter of cylindrical part 1 | 75 mm |
| Diameter of reaction zone B over a length of 1000 mm | 124 mm |
| Diameter of reaction zone B over a length of 350 mm | 100 mm |
| Cross-section of ammonia outflow opening | 325 mm$^2$ |
| Cross-section of phosphoric-acid outflow opening | 141 mm$^2$ |
| Number of diffuser rings | 2 |
| Ratio of length to diameter of reaction zone | 18:1 |

In experiments 1 and 2, the diameter of the discharge opening 17 was 35 mm, in experiment 3 it was 70 mm. The discharge was directed downwards through a 90° bend. In the reactor, a product consisting almost completely of monoammonium dihydrogen phosphate was prepared from phosphoric acid with a $P_2O_5$ content of 43.0%. The amounts of phosphoric acid and $NH_3$ supplied including the feed rates, the molar $NH_3/H_3PO_4$ ratio of the resulting product are given in Table 1.

The $NH_3$ efficiency as reported in the following Tables is the quotient of the molar $NH_3/H_3PO_4$ ratio in the product and the same ratio calculated from the total amounts of $NH_3$ and $H_3PO_4$ supplied, and, consequently, is a measure of the amount of $NH_3$ converted. The amount of $NH_3$ already present in the phosphoric acid is included in this calculation.

The resulting product flowed freely from the discharge opening onto a stationary surface. It was established by various samples taken from various spots of the resulting pile of granules that the product showed only slight inhomogeneity. But when similar experiments were carried out with a reactor in which the ratio of length to diameter of the reaction zone was 5:1, the inhomogeneity was considerably higher.

EXAMPLE 2

A series of 6 baffles or blades 15 and 16 were mounted in a reactor in which the cross-section of the ammonia-outflow opening was 300 m$^2$ and the other dimensions were similar to those of the reactor used in Example 1. The diameter of discharge opening 17 was always 35 mm. Phosphoric acid with a $P_2O_5$ content of 44.7% was used to prepare a product that contained a considerable amount of diammonium monohydrogen phosphate in addition to monoammonium dihydrogen phosphate. The data about the starting materials used and the resulting products are reported in Table 2.

The products were fully homogeneous. In experiment 9, in which the amount of $NH_3$ fed in and the feed pressure used were comparatively low, it was found to be impossible to avoid deposition of the product, in spite of regularly purging the reactor with steam. The result was that the feed pressure for a feeding capacity of 500 m$^3$ $NH_3$/h (N.T.P.) rose from 284 to 431 kPa in 6 days and the noise level became inadmissibly high. These phenomena no longer occurred with an increased amount of $NH_3$ and the required feed pressure.

The product leaving the reactor was collected in the granulating drum, in which further conversion of phosphoric acid was effected by means of liquid $NH_3$. Here too, a small part of the $NH_3$ fed in was not converted and passed from the drum to the washing device along with the air. The absorption of this amount of $NH_3$ in the washing acid gave rise to an increase of the molar $NH_3/H_3PO_4$ ratio of the feed acid to the values stated in Table 2.

EXAMPLE 3

The reactor used for the experiments of Example 1 was equipped with a discharge opening 17 having a diameter of 70 mm and six baffles or blades 15 and 16. Here the phosphoric aid fed in was diluted by the addition of water. A small amount of steam was added to the $NH_3$. The data and results are given in Table 3.

As in the experiments of Example 2, liquid $NH_3$ was fed into the granulating drum and the unconverted portion was absorbed in the phosphoric acid in the washing apparatus.

In experiments 20 through 23 the product from the reactor had such a high moisture content that deposits and lumps formed in the granulating drum, which had to be removed several times each hour. The granulate became so coarse that the experiments had to be stopped after a period of time. If so desired, the product obtained in these experiments can be processed into liquid fertilizers.

EXAMPLE 4

A product consisting substantially of diammonium monohydrogen phosphate was prepared in an apparatus according to FIG. 2, but with two parallel reactors instead of one. At different distances from the ammonia and phosphoric acid outflow openings, the two reactors were provided with two discharge pipes pointing directly downwards.

In contrast to the reactors used in the experiments of Examples 1 through 3, two baffle plates 15 and 16 were now present. The phosphoric acid used had a P₂O₅ content of between 47.5 and 49.5%. The outflow rate of the phosphoric acid varied from 3.4 to 4.9 m/sec and that of the ammonia from 449 to 565 m/sec (N.T.P.). The length to diameter ratio of the reaction zones in the two reactors was about 18.1.

The product discharged from the reactors had a molar $NH_3/H_3PO_4$ ratio that varied from between 1.27 to 1.35, in dependence on, among other things, the concentration of the phosphoric acid and the amounts of this acid and of the ammonia supplied. This ratio conveniently increased to a value varying from 1.69 to 1.75 by supplying liquid ammonia to the bed in the granulating drum.

tapered and narrower at the outflow ends which are substantially coterminous with each other, a cylindrical reaction chamber larger than and coaxial with said two-phase spraying means having at least one discharge outlet at one end thereof, and said two-phase spraying means being positioned at least partially in said chamber, said reaction chamber having a diameter from about 2 to about 4 times the outer diameter of the outflow opening of the outer coaxial duct and said reaction chamber having a length of from about 10 to about 25 times of said diameter, and a plurality of baffle plates arranged successively downstream of said spraying means in said chamber, each two consecutive baffle plates being twisted in opposite directions and the first of said baffle plates positioned a distance of at least 8 times the diameter of said cylindrical reaction chamber from said coterminous end.

2. The apparatus according to claim 1 wherein each of said baffle plates has a dimension normal to the central axis of cylindrical space that is equal to the diameter of said space.

TABLE 1

Example 1

| exp. No. | NH₃-feed m³/h (N.T.P.) | NH₃-feed m/sec (N.T.P.) | operating pressure NH₃ kPa | phosphoric-acid feed m³/h | phosphoric-acid feed m/sec | phosphoric-acid feed mol.NH₃/H₃PO₄ | product mol.NH₃/H₃PO₄ | NH₃-efficiency % |
|---|---|---|---|---|---|---|---|---|
| 1 | 835 | 714 | 334 | 4.0 | 8.0 | 0.18 | 0.95 | 80 |
| 2 | 840 | 718 |  | 4.05 | 8.0 | 0.17 | 1.08 | 92 |
| 3 | 945 | 808 |  | 4.5 | 8.8 | 0.22 | 0.89 | 85 |
| 4 | 1020 | 872 |  | 5.0 | 9.8 | 0.27 | 0.98 | 78 |
| 5 | 1050 | 897 |  | 5.0 | 9.8 | 0.27 | 1.02 | 80 |
| 6 | 1180 | 1009 |  | 5.5 | 10.8 | 0.20 | 1.00 | 81 |
| 7 | 1280 | 1094 |  | 6.9 | 11.8 | 0.17 | 1.00 | 83 |
| 8 | 1360 | 1162 |  | 6.5 | 12.8 | 0.17 | 1.02 | 86 |

TABLE 2

Example 2

| exp. no. | NH₃-feed m³/h (N.T.P.) | NH₃-feed m/sec (N.T.P.) | operating pressure NH₃ kPa | phosphoric-acid feed m³/h | phosphoric-acid feed m/sec | phosphoric-acid feed mol.NH₃/H₃PO₄ | product mol.NH₃/H₃PO₄ | moisture % | NH₃-efficiency % |
|---|---|---|---|---|---|---|---|---|---|
| 9 | 500 | 463 | 284 | 2.5 | 5.0 | 0.36 | 1.30 |  |  |
| 10 | 587 | 543 | 373 | 2.5 | 5.0 | 0.35 | 1.35 | 3.8 | 92.9 |
| 11 | 704 | 652 | 412 | 3.0 | 5.8 | 0.35 | 1.35 | 4.0 | 96.4 |
| 12 | 587 | 543 | 333 | 2.5 | 5.0 | 0.35 | 1.35 | 5.9 | 96.4 |
| 13 | 636 | 588 | 343 | 2.5 | 5.0 | 0.35 | 1.36 | 7.3 | 91.3 |

TABLE 3

Example 3

| exp. no. | NH₃-feed m³/h N.T.P. | NH₃-feed m/sec (N.T.P.) | operating pressure NH₃ kPa | phosphoric-acid feed % P₂O₅ | phosphoric-acid feed m³/h | phosphoric-acid feed m/sec | phosphoric-acid feed mol.NH₃/H₃PO₄ | product mol.NH₃/H₃PO₄ | moisture % | NH₃-efficiency % |
|---|---|---|---|---|---|---|---|---|---|---|
| 14 | 1026 | 857 | 383 | 45.6 | 5.05 | 10.0 | 0.42 | 1.23 | 6.2 | 93.2 |
| 15 | 1283 | 1096 | 461 | 45.6 | 5.05 | 10.0 | 0.36 | 1.37 | 8.3 | 92.2 |
| 16 | 1231 | 1052 | 461 | 44.3 | 5.0 | 9.8 | 0.27 | 1.32 | 8.3 | 94.3 |
| 17 | 1108 | 947 | 412 | 44.6 | 4.95 | 9.7 | 0.38 | 1.31 | 8.5 | 93.6 |
| 18 | 1334 | 1140 | 481 | 42.5 | 5.0 | 9.8 | 0.31 | 1.47 | 11.2 | 90.3 |
| 19 | 1231 | 1052 | 422 | 42.0 | 5.0 | 9.8 | 0.36 | 1.41 | 10.1 | 90.9 |
| 20 | 1170 | 1000 | 461 | 40.5 | 5.0 | 9.8 | 0.35 | 1.49 | 16.2 | 93.9 |
| 21 | 964 | 824 | 353 | 40.5 | 5.0 | 9.8 | 0.35 | 1.34 | 19.0 | 97.7 |
| 22 | 1067 | 912 | 412 | 40.5 | 5.0 | 9.8 | 0.35 | 1.44 | 16.3 | 97.4 |
| 23 | 1272 | 1087 | 461 | 39.9 | 5.0 | 9.8 | 0.36 | 1.51 | 17.2 | 87.5 |

What is claimed is:

1. An apparatus for preparing an ammonium orthophosphate product from ammonia and phosphoric acid comprising, a two-phase spraying means including two coaxial ducts, one positioned inside the other for supplying respectively phosphoric acid and ammonia and mixing the same together, each of said ducts being